United States Patent Office 3,715,412
Patented Feb. 6, 1973

3,715,412
STABILIZED POLYURETHANE ELASTOMER
COMPOSITION
Yasuji Nakahara and Kiyoshi Ichikawa, both of 100
Kawanarijima, and Kunio Kondo, 174 Miyajima, all
of Fujishi, Shizuokaken, Japan
No Drawing. Filed Mar. 3, 1971, Ser. No. 128,630
Int. Cl. C08g 45/14
U.S. Cl. 260—835                                    6 Claims

ABSTRACT OF THE DISCLOSURE

The invention provides a polymeric composition having an intrinsic viscosity of 0.05–1.2, which gives a stabilized polyurethane elastomer composition having an excellent whiteness-retainability by mixing with or coating upon a polyurethane elastomer prepared from a substantially linear polymer having terminal hydroxy groups and a molecular weight of 600 to 5000, an organic diisocyanate and a bifunctional chain extender having active hydrogen atoms, said polymeric composition comprises a vinyl polymer of a monomer of the formula:

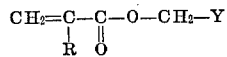

wherein R is hydrogen or lower alkyl and Y is a member selected from the group consisting of:

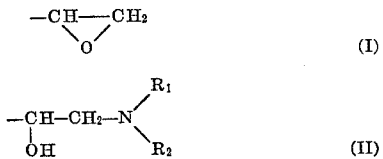

wherein $R_1$ and $R_2$ are individually alkyl group having 1–20 carbon atoms; substituted alkyl group having 1–20 total carbon atoms wherein substituent may contain O, N or S atom; cycloalkyl having 3–20 carbon atoms; substituted cycloalkyl having 3–20 total carbon atoms wherein substituent may contain O, N or S atom; aromatic group of 1 to 2 rings, having 6–20 total carbon atoms wherein said ring or rings may have 1 to 3 substituents selected from the group consisting of halo, alkyl and hydroxy groups; 5- to 6-membered heterocyclic radical wherein said ring may have substituent selected from the group consisting of halo, phenoxy, alkyl-substituted phenoxy, hydroxy-substituted phenoxy, phenylthio, alkyl-substituted phenylthio, hydroxy-substituted phenylthio, alkoxy and alkylthio or

wherein $R_3$ and $R_4$ have the same meaning as $R_1$ and $R_2$ but must not be hydrogen, further $R_1$ and $R_2$ can collectively form 5- to 6-membered ring wherein said ring may contain S, O or N, alkyl or halogen substituent, and one of $R_1$ and $R_2$ can be a hydrogen atom; at least 5% of the Y groups being II.

DESCRIPTION OF THE INVENTION

Generally, the polyurethane elastomers have excellent mechanical properties and are used in a wide variety of valuable application fields, but they have a tendency to undergo undesirable coloration and deterioration, when exposed to sun light, waste gas, various industrial smogs, etc., and are thus subject to limitations in their uses and applications.

Therefore, it has been heretofore proposed to use such additives as various absorbers for ultraviolet ray or antioxidants with the polyurethane elastomers, but when the polyurethane elastomers containing such additives are left standing in air for a long period of time or repeatedly washed, the additives are dissipated or dissolved out. Therefore, the effect obtained by adding the additives cannot be maintained for a long time.

Thus, an object of the present invention is to provide a novel polymeric composition which is incorporated in polyurethane elastomer to give a stabilized elastomer composition. Another object of the present invention is to provide a stabilized polyurethane elastomer composition capable of retaining whiteness for a considerably long time. Such objects can be attained by the polymeric composition of the present invention and a polyurethane elastomer composition of the present invention.

The polymeric compositions according to the present invention have an intrinsic viscosity of 0.05–1.2 and consist of a vinyl polymer of a monomer of the formula:

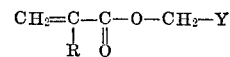

wherein R is hydrogen or lower alkyl and Y is a member selected from the group consisting of:

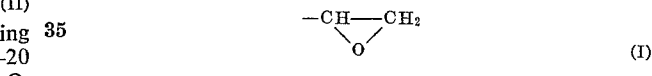

wherein $R_1$ and $R_2$ are individually alkyl group having 1–20 carbon atoms; substituted alkyl group having 1–20 total carbon atoms wherein substituent may contain O, N or S atom; cycloalkyl having 3–20 carbon atoms; substituted cycloalkyl having 3–20 total carbon atoms wherein substituent may contain O, N or S atom; aromatic group of 1 to 2 rings, having 6–20 total carbon atoms wherein said ring or rings may have 1 to 3 substituents selected from the group consisting of halo, alkyl and hydroxy groups; 5- to 6-membered heterocyclic radical wherein said ring may have substituent selected from the group consisting of halo, phenoxy, alkyl-substituted phenoxy, hydroxy-substituted phenylthio, phenylthio, alkyl-substituted phenoxythio, hydroxy-substituted phenylthio, alkoxy and alkylthio or

wherein $R_3$ and $R_4$ have the same meaning as $R_1$ and $R_2$ but must not be hydrogen, further $R_1$ and $R_2$ can collectively form 5- to 6-membered ring wherein said ring may contain S, O or N, alkyl or halogen substituent, and one of $R_1$ and $R_2$ can be a hydrogen atom; at least 5% of the Y groups being II.

The polyurethane elastomer composition according to the present invention comprises a polyurethane elastomer and 0.1–20% by weight of the above-mentioned polymeric composition of the present invention.

In the composition of the present invention, the whiteness of the polyurethane can be retained for a considerable period of time when the above-mentioned polymeric composition is present, though the reason for this is not clear, and thus it is quite an unexpected fact.

So long as said polymeric composition has an intrinsic viscosity of 0.05–1.2, it shows whiteness retention effectiveness of sufficient durability when incorporated into polyurethane in an amount of 0.1–20% by weight based upon the polyurethane elastomer composition.

The polymeric composition of the present invention (hereinafter referred to as P-derivative) having an intrinsic viscosity of 0.05–1.2 which is a polymer of a monomer of the formula:

$$CH_2=C-C-CH_2-Y$$
$$\phantom{CH_2=}R\phantom{-}O$$

[wherein R is hydrogen or lower alkyl and Y is a member selected from the group consisting of:

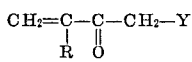
(I)

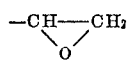
(II)

wherein $R_1$ and $R_2$ are individually alkyl group having 1–20 carbon atoms; substituted alkyl group having 1–20 total carbon atoms wherein substituent may contain O, N or S atom; cycloalkyl having 3–20 carbon atoms; substituted cycloalkyl having 3–20 total carbon atoms wherein substituent may contain O, N or S atom; aromatic group of 1 to 2 rings, having 6–20 total carbon atoms wherein said ring or rings may have 1 to 3 substituents selected from the group consisting of halo, alkyl and hydroxy groups; 5- or 6-membered heterocyclic radical wherein said ring may have substituent selected from the group consisting of halo, phenoxy, alkyl-substituted phenoxy, hydroxy-substituted phenoxy, phenylthio, alkyl-substituted phenoxythio, hydroxy-substituted phenylthio, alkoxy and alkylthio or

wherein $R_3$ and $R_4$ have the same meaning as $R_1$ and $R_2$ but must not be hydrogen, further $R_1$ and $R_2$ can collectively form 5- to 6-membered ring wherein said ring may contain S, O or N, alkyl or halogen substituent, and one of $R_1$ and $R_2$ can be a hydrogen atom; at least 5% of the Y groups being II, is obtained by reacting a vinyl polymer of a compound (hereinafter referred to as A compound) having the general formula:

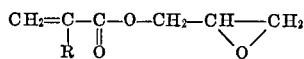

(wherein R has the same meaning as in the above formula), with a compound (hereinafter referred to as B compound) having the general formula:

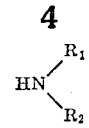

wherein $R_1$ and $R_2$ have the same meaning as in the above formula, in the presence or absence of a solvent or by reacting a corresponding compound A with a compound B and polymerizing the resultant vinyl monomer in the presence of a polymerization catalyst, in the presence or absence of a solvent, by a solvent or bulk or emulsion polymerization manner. Representative A compounds include glycidyl-α-alkylacrylates, and glycidyl acrylate, glycidyl methacrylate and glycidyl ethacrylate are used preferably. However, glycidyl methacrylate is most preferable from economic view point or for easy handling.

As compounds B, aliphatic primary or secondary amines, aromatic amines, araliphatic means, alicyclic amines, heterocyclic amines and hydrazine derivatives can be used, and preferred examples include dicyclohexylamine, ethyl cyclohexylamine, n-butylamine, sec.-butylamine, tert-butylamine, diethylamine, di-n-propylamine, di-n-butylamine, ethanolamine, aminoethyl mercaptane, aniline, α-naphthylamine, β - naphthylamine, 4 - aminophenol, 4-aminotoluene, 2-methyl-4-aminophenol, 2-tert-butyl-4-aminophenol, 2,6-di-tert-butyl - 4 - aminophenol, pyrrolidine, piperidine, piperidone, triacetoneamine, 2,4-dichloro-6-amino-1,3,5-triazine, 2,4-bis(4-hydroxy - 3,5-di-tert-butylphenoxy)-6-amino-1,3,5-triazine, 2 - chloro-4-octylthio-6-amino-1,3,5-triazine, 2-chloro - 4 - hydroxy-3,5-di-tert-butylphenylthio)-6-amino - 1,3,5 - triazine, dimethylhydrazine, diethylaminomethylamine, diethylaminoethylamine, diethylaminopropylamine, etc.

The above compounds B may be used individually or in combinations of two or more.

The P-derivative of the present composition can be used individually or in combinations of two or more. About 0.1–20% by weight of the P-derivative is added, in total, on the basis of the polyurethane elastomer.

In preparing the composition, it is preferable to use the P-derivative as such or after it is dissolved in a suitable solvent, and it can be added at any stage before or after the completion of the polymerization of the polyurethane. In any case, the P-derivative can be readily and uniformly mixed and dispersed, because it has an excellent compatibility with the polyurethane.

Furthermore, the P-derivative of the present composition can bring about a satisfactory effect even when the P-derivative is attached to the surface of the polyurethane. For example, a satisfactory effect can be attained by dipping the polyurethane elastomer in a solution obtained by dissolving or dispersing the P-derivative in a solvent inert to the polyurethane. The preferable amount of the P-derivative to be used in case of coating is the same as in case of mixing.

The solutions of polyurethane elastomer composition containing P-derivative are useful in both wet spinning process and dry spinning process for producing polyurethane fibers. It is an advantage of polyurethane elastomer composition containing the P-derivative that no clogging of spinnerette inter-filamentary adhesion occurs in the spinning of the polymer. Such troubles as above mentioned are often encountered in the spinning of conventional polyurethane polymers. Since the retainability of whiteness of the fibers produced from the polyurethane elastomer composition containing P-derivative is superior, products of excellent light-fastness are obtained, and further in dyeing it is possible to attain high grade of brightness. Furthermore the resultant fibers have excellent resilience.

As the polyurethane elastomers, all the conventional compounds prepared from as principal components, a substantially linear polymer having terminal hydroxy groups and a molecular weight of 600 to 5000, an organic diisocyanate and a bifunctional chain extender having active hydrogen atoms, can be used, but it is convenient from the view point of application to use the one prepared according to the following method: polyether glycol or polyester glycol having a molecular weight of 600–5000, preferably 800–2200, is reacted with a molar excess of an organic diisocyanate (preferably 1.2 to 2.0 times excess) in the presence or absence of an inert polar solvent to produce an intermediate polymer having isocyanate radicals at both ends which is further reacted with a bifunctional active-hydrogen-containing compound in a substantially stoichiometrical amount relative to the isocyanate radical of the intermediate polymer in a medium of inert solvent to effect chain extension.

Preferable examples for polyether glycol or polyester glycol include polyethylene ether glycol, polypropylene ether glycol, polytetramethylene ether glycol, polypentamethylene ether glycol, polyethylene adipate glycol, polypropylene adipate glycol, polybutylene adipate glycol, polyethylene succinate glycol, polypropylene succinate glycol, polybutylene succinate glycol, polyethylene sebacate glycol, polypropylene sebacate glycol, polybutylene sebacate glycol, poly-ε-caprolactone glycol, poly-δ-valerolactone glycol.

Among organic diisocyanates, aromatic diisocyanates such as p-phenylene diisocyanate, 4,4′-isopropylidenediphenyldiisocyanate, 2,4-tolylene-diisocyanate, 2,6-tolylene-diisocyanate are illustrated, but considering from the mechanical properties of elastomer, 4,4′-diphenylmethane-diisocyanate is particularly preferred.

Bifunctional active-hydrogen-containing compounds used as chain-extending agents include organic diamines, glycols, dihydrazide, hydrazine and water i.e., diamines such as ethylene diamine, 1,2-propylene diamine, tetramethylene diamine, hexamethylene diamine, p-xylene diamine, m-xylene diamine, cyclohexane bismethylamine, 1,4-diaminopiperazine, 1,4-cyclohexylene diamine, methylene-bis-cyclohexylamine, glycols such as ethylene glycol, propylene glycol, tetramethylene glycol, hexamethylene glycol, xylene glycol, hydrazine derivatives such as hydrazine, carbohydrazide, diaminobiuret, adipic hydrazide and water. Among them, organic diamines such as ethylene diamine, 1,2-propylene diamine, tetramethylene diamine or the like are preferred. The above-mentioned compounds are not illustrated for the purpose of limitation. It is also possible to use two or more as a mixture.

As inert polar solvents for preparing a polyurethane elastomer, dimethyl formamide, dimethyl acetamide, dimethyl sulphoxide are illustrated.

In preparing the present composition, a more outstanding effect can be obtained by using the heretofore well known absorbers of ultraviolet rays, antioxidants, and other additives.

The present composition is further illustrated by the following examples.

EXAMPLE 1

(1) Production of P-derivative

To a solution containing 14.2 parts of a vinyl polymer of glycidyl methacrylate (having an intrinsic viscosity of 0.61 measured at 25° C.) dissolved in 56.8 parts of dimethyl formamide was added dropwise a mixed solution of 10 parts of n-butylamine and 50 parts of dimethyl formamide at 75° C. with stirring. Stirring was continued for 2 hours after completion of the addition, then unreacted n-butylamine was removed under a reduced pressure and 20 parts of P-derivative, P-1, was obtained by reprecipitation in a mixed system of methanol and water. P-1 had an intrinsic viscosity of 0.72 and epoxy conversion of 85%. It was evidence for formation of P-1, that the reduction in the absorption of epoxy group at 910 cm.$^{-1}$ and new absorption of hydroxyl group at 3500 cm.$^{-1}$ of the infra-red absorption spectrum were observed.

(2) Preparation of the polyurethane elastomer 100.0 parts of polytetramethylene glycol having a mean molecular weight of 1200 and 31.2 parts of 4,4′-diphenylmethane diisocyanate were reacted together at 85° C. in a nitrogen gas stream for 120 minutes with stirring, whereby an intermediate polymer having isocyanate groups at the terminals was obtained. Then, the resulting intermediate polymer was cooled to room temperature, admixed with 183.7 parts of dried dimethyl formamide and dissolved therein. Independently, 2.4 parts of ethylene-diamine and 0.30 part of diethylamine were dissolved in 122.4 parts of dimethyl formamide, and the above-mentioned intermediate polymer solution was added to the resulting solution at room temperature. The mixed solution caused rapid reaction, whereby a highly viscous solution (1500 poise, at 30° C.) was obtained.

A solution containing 2.6 parts of said P-1 dissolved in dimethyl formamide was added thereto, stirred and mixed in a homomixer. The solution was extruded into water at 60° C. through a spinning nozzle. In this manner, elastic yarns having a tenacity of 0.69 g./d. and elongation of 720% were obtained.

The coloration and tenacity-retainability observed when the yarns were subjected to light irradiation in a Fade-o-meter for 20 hours are shown in Table 1. The Comparative Example A is the case where no P-1 was added in Example 1.

TABLE 1

Tenacity-retainability and coloration after 20 hours irradiation in Fade-o-meter

| | Percent | | |
| --- | --- | --- | --- |
| | Tenacity-retainability | Elongation-retainability | Coloration |
| Example 1 | 90.0 | 95.6 | No. |
| Comparative Example A | 26.2 | 31.2 | Yellow. |

EXAMPLE 2

A polyurethane solution (1300 poise, 30° C.) comprising polyethylene adipate, 4,4′-diphenylmethane diisocyanate and tetramethylene diamine as bases was obtained in the same manner as in Example 1 (2). Also, thirteen P-derivatives of cyclohexylamine, diethylamine, piperidine, triacetoneamine, 2,6-di-tert-butyl-4-aminophenol, diethanolamine, diethylaminoethylamine, an equimolar mixture of n-butylamine and piperidine, aminoethyl mercaptane, pyrrolidine, 2,4-dichloro-6-amino-1,3,5-triazine, 2-chloro-4-octylthio-6-amino-1,3,5-triazine, and 2-chloro-4-(hydroxy-3,5-di-tert-butylphenoxy)-6-amino-1,3,5-triazine, respectively, as the compound B, in place of that of Example 1 (1), were obtained (which will be referred to as P-2, P-3, P-4, P-5, P-6, P-7, P-8, P-9, P-10, P-11, P-12, P-13 and P-14, respectively. Those compositions obtained by adding 1–3% by weight of these to said polyurethane solution on the basis of solid content of the solution, or those obtained by such addition together with a well-known stabilizer were extended to a thickness of 0.5 mm. on glass plate to form films by removing the solvent under a reduced pressure. The films were used as samples for the light resistance test.

Further, for comparison, films were also prepared as samples for the light resistance test from compositions containing no additive or from those containing only a well-known stabilizer. As the light resistance test, the compositions were irradiated at the same time by infrared rays for 10, 20, 30 and 50 hours in a Fade-o-meter. The results are shown in Table 2.

TABLE 2
Coloration of films after irradiation for 10, 20, 30 or 50 hours in Fade-o-meter

| Test No. | P-derivative Name | Amount, added, percent | Epoxy conversion, percent | Well-known stabilizer Name | Amount added, percent | Hours 10 | 20 | 30 | 50 | Intrinsic viscosity |
|---|---|---|---|---|---|---|---|---|---|---|
| 1 | | | | | | Light yellow | Yellow | Yellowish brown | Yellowish brown | |
| 2 | | | | 2-(2-hydroxy-5-methylphenyl) benzotriazole | 2.0 | Colorless | Light yellow | Yellow | do | |
| 3 | | | | Titanium oxide / 4,4'-butylidene-bis-(6-tert.-butyl-3-methylphenol) | 5.0 / 2.0 | do | do | Light yellow | do | |
| 4 | P-2 | 1.0 | 75 | | | do | Colorless | do | Yellow | 0.69 |
| 5 | P-3 | 2.0 | 90 | | | do | do | do | Light yellow | 0.91 |
| 6 | P-3 | 2.0 | | 2-(2-hydroxy-5-methylphenyl) benzotriazole | 2.0 | do | do | Colorless | Colorless | 0.91 |
| 7 | P-3 | 2.0 | | Titanium oxide | 5.0 | do | do | do | Light yellow | 0.91 |
| 8 | P-4 | 2.0 | 52 | | | do | do | do | Colorless | 0.63 |
| 9 | P-5 | 2.0 | 31 | | | do | do | do | do | 0.59 |
| 10 | P-6 | 2.0 | 6.2 | | | do | do | do | do | 0.68 |
| 11 | P-7 | 2.0 | 86 | | | do | do | do | Light yellow | 0.87 |
| 12 | P-8 | 1.0 | 42 | | | do | do | Light yellow | do | 0.81 |
| 13 | P-8 | 2.0 | 42 | | | do | do | Colorless | do | 0.81 |
| 14 | P-8 | 3.0 | 42 | | | do | do | do | Colorless | 0.81 |
| 15 | P-9 | 2.0 | 82 | | | do | do | do | do | 0.88 |
| 16 | P-10 | 2.0 | 70 | | | do | do | do | Light yellow | 0.86 |
| 17 | P-11 | 2.0 | 81 | | | do | do | do | do | 0.88 |
| 18 | P-12 | 2.0 | 20 | | | do | do | do | Colorless | 0.65 |
| 19 | P-13 | 2.0 | 15 | | | do | do | do | do | 0.63 |
| 20 | P-14 | 2.0 | 11 | | | do | do | do | do | 0.60 |

Furthermore, the light resistance tests were carried out for the films of Test Nos. 3 and 9 after extraction with benzene for three days, dipping in perchloroethylene at room temperature for 3 hours or dipping in 5% Marseilles soap for three hours, and, as shown in Table 3, the polyurethane prepared from the present composition retained its whiteness.

TABLE 3
Coloration of films after irradiation for 10, 20, 30 or 50 hours in a Fade-o-meter

| Treatment method | Film of Test No. 3 after— | | | | Film of Test No. 9 after— | | | |
|---|---|---|---|---|---|---|---|---|
| | 10 hours | 20 hours | 30 hours | 50 hours | 10 hours | 20 hours | 30 hours | 50 hours |
| Benzene extraction | Yellow | Yellowish brown | Yellowish brown | Yellowish brown | None | None | None | Light yellow |
| Perchloroethylene | do | do | do | do | do | do | do | Do |
| Marseilles soap | Light yellow | Yellow | do | do | do | do | do | None |

EXAMPLE 3

To the highly viscous bath solution obtained in Example 1 (prior to the addition of the P-derivative) was added 5.0% by weight of titanium oxide on the basis of solids content of the solution, and the resulting mixture was stirred and uniformly mixed.

The elastic yarns obtained by wet spinning were treated with a chloroform solution containing 10% of P-3 obtained in Example 2 at room temperature for one hour and washed sufficiently with water, dried and used as a sample for the light resistance test. 1.8% by weight of P-3 was attached to the yarns.

For comparison, the light resistance test of the untreated elastic yarns (comparative example B) is shown also in Table 4.

TABLE 4
Tenacity and elongation retainabilities and coloration after irradiation for 20 hours in Fade-o-meter

| | Percent | | |
|---|---|---|---|
| | Tenacity retainability | Elongation retainability | Coloration |
| Example 3 | 88.4 | 91.6 | Colorless |
| Comparative Example B | 38.7 | 42.8 | Yellow |

EXAMPLE 4

A solution obtained by dissolving 21.5 g. of a 1:1 addition product of glycidyl methacrylate and diethylamine, in 65 g. of methyl ethyl ketone, was mixed with a solution obtained by dissolving 0.164 g. of azobisisobutyronitrile in 21 g. of methyl ethyl ketone. The solution mixture was reacted on heating at 60° C. for 2 hours under the stream of nitrogen gas introduced therein. After completion of the reaction, it was diluted with 300 g. of methyl ethyl ketone and then poured into 1 l. of water, whereby 59 g. of a P-derivative (P-3', Intrinsic viscosity: 0.32, epoxy content: 0) was precipitated. This P-3' had an intrinsic viscosity of 0.31 as measured in dimethylformamide at 25° C. Elastic yarns containing therein 2.0 weight percent of P-3' were prepared according to the method of Example 1 (2). The elastic yarns thus prepared had a tenacity of 0.71 g./d. and an elongation of 73%, and no difference in mechanical properties could be observed between these elastic yarns and those in Example 1. Further, no reduction in tenacity and elongation nor coloring could be observed after 20 hours irradiation by means of a Fade-o-meter.

EXAMPLE 5

Other P-derivatives (referred to herein P–15 and P–16) were prepared by substituting vinyl polymers of glycidyl acrylate and glycidyl ethacrylate for that of glycidyl methacrylate in Example 1, respectively. The conversion of epoxy group were 76% and 82%, and the intrinsic viscosities were 0.80 and 0.40, respectively for P–15 and P–16. The percentages of tenacity-retainability and elongation-retainability and the coloration after 20 hours irradiation by means of a Fade-o-meter, are shown in Table 5.

TABLE 5

| | Percent | | |
|---|---|---|---|
| | Tenacity retainability | Elongation retainability | Coloration |
| P-15 | 90.2 | 94.3 | None |
| P-16 | 89.3 | 92.6 | Do |

3,715,412

EXAMPLE 6

One mol of poly-ε-caprolactone glycol having an average molecular weight of 2,000 and 2 mols of 4,4'-diphenylmethanediisocyanate were reacted together at 95° C., for 120 minutes, with stirring, in a dried nitrogen gas stream to give an intermediate polymer. The resultant polymer was cooled to room temperature, and then dissolved in 5 kg. of dried dimethylacetamide to give a solution. Separately, one mol of ethylenediamine was dissolved in 2.5 kg. of dimethylacetamide. To the resultant solution was added the above-mentioned solution of the intermediate polymer, at room temperature. The solution mixture reacted rapidly to give a polyurethane solution having a viscosity of 1,320 poises as measured at 30° C. To this solution were added 4 weight percent based upon the weight of the solids in the polyurethane solution, of the compound, P-3, obtained in Example 2, and further, as well-known stabilizers, 5 weight percent of titanium dioxide and 1 weight percent of 1,3,5-trimethyl-2,4,6-tris(3,5-di-t-butyl-4-hydroxybenzyl) benzene, followed by sufficient stirring to make a homogeneous solution. This solution was subjected to dry-spinning according to a usual method to give elastic yarns.

In the production of the above-mentioned elastic yarns, various kinds of glycol having a mean molecular weight of 2,000, various kinds of organic diisocyanate, and various kinds of chain-extending agent in a ratio of 1 mol:2 mols:1 mol were used as listed in Table 6. The viscosities of the polyurethane solution (as measured at 30° C.) obtained after completion of the reaction are also shown in Table 6.

TABLE 6

| Polyurethane No. | Glycol | Organic diisocyanate | Chain-extending agent | Viscosity (poise) |
|---|---|---|---|---|
| 1 | Poly-ε-caprolactone glycol. | 4,4'-diphenylmethanediisocyanate. | Ethylenediamine. | 1,320 |
| 2 | Polybutylene adipate glycol. | ...do... | Propylenediamine. | 1,050 |
| 3 | Poly-δ-valerolactone glycol. | 4,4'-isopropylidenediphenyldiisocyanate. | ...do... | 1,510 |
| 4 | Polybutylene succinate glycol. | ...do... | Ethylenediamine. | 1,370 |
| 5 | Polypropylene adipate glycol. | 2,4-tolylenediisocyanate. | Tetramethylenediamine. | 1,200 |
| 6 | Poly-ε-caprolactone glycol. | ...do... | Propylenediamine. | 1,350 |
| 7 | Polypropylene succinate. | 2,6-tolylenediisocyanate. | Tetramethylenediamine. | 1,700 |
| 8 | Polyethylene glycol. | ...do... | Ethylene glycol. | 1,870 |
| 9 | Polypropylene glycol. | Phenylenediisocyanate. | Hydrazine. | 2,000 |
| 10 | Polyethylene sebacate glycol. | ...do... | Propylenediamine. | 1,360 |

10 kinds of elastic yarns thus obtained were dipped in 5% marseilles soap for 3 hours, followed by sufficient washing with water and drying to make samples for light-fastness test. In Table 7 are shown percentages of tenacity-retainability and those of elongation-retainability, and coloration after 20 hours irradiation by means of a fade-o-meter. As a control, the same test was carried out using the same elastic yarns as in Polyurethane No. 1, except that the compound, P-3, was not incorporated therein. The result is shown as Control C.

TABLE 7

| | Percent | | |
|---|---|---|---|
| | Tenacity retainability | Elongation retainability | Coloration |
| Polyurethane: | | | |
| 1 | 99.6 | 103.2 | No. |
| 2 | 96.7 | 99.4 | No. |
| 3 | 101.5 | 103.7 | No. |
| 4 | 99.8 | 100.6 | No. |
| 5 | 93.4 | 95.0 | No. |
| 6 | 97.1 | 98.2 | No. |
| 7 | 95.4 | 97.0 | No. |
| 8 | 98.3 | 97.1 | No. |
| 9 | 97.2 | 96.4 | No. |
| 10 | 97.7 | 99.9 | No. |
| Control C | 42.3 | 48.3 | Yellow. |

What is claimed is:

1. A polyurethane elastomeric composition containing
   (a) a vinyl copolymer; and
   (b) a polyurethane elastomer
said vinyl copolymer (a) comprising 0.1 to 20% by weight based upon said polyurethane elastomer (b), wherein said vinyl copolymer (a) has an instrinsic viscosity of 0.05 to 1.2 has the following repeating unit:

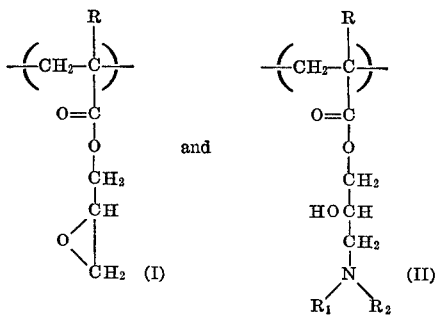

wherein
R is hydrogen, methyl or ethyl;
each $R_1$ and $R_2$ is individually hydrogen, an alkyl group having 1–20 carbon atoms which may contain O, N or S atoms; cycloalkyl group having 3–20 carbon atoms which may contain O, N or S atoms; an aromatic group of 1 to 2 rings having 6–20 total carbon atoms which may have 1 to 3 substituents selected from the group consisting of halo, alkyl and hydroxy groups; a 5 to 6 membered heterocyclic group which may be substituted by halo, phenoxy, alkyl-substituted phenoxy, hydroxy-substituted phenoxy, phenylthio, alkyl - substituted phenylthio, hydroxy - substituted phenylthio, alkoxy and alkylthio; or

wherein $R_3$ and $R_4$ are as defined for $R_1$ and $R_2$ other than hydrogen;

or together $R_1$ and $R_2$ collectively form a 5- to 6-membered ring wherein said ring may contain O, N or S or halogen substituent; provided that at least one of $R_1$ and $R_2$ is other than hydrogen, said repeating unit (II) occupying 5%–100% of said copolymer and wherein said polyurethane elastomer (b) is obtained by reacting a substantially linear polymer having terminal hydroxy groups and a molecular weight of 600 to 5000 a bifunctional chain extender having active hydrogen atoms and an organic diisocyanate.

2. A polyurethane elastomeric composition according to claim 1 wherein the

moiety of (II) is selected from the group consisting of dicyclohexylamino, ethyl-cyclohexylamino, n-butylamino, sec.-butylamino, tert.-butylamino, diethylamino, di-n-proylamino, di-n-butylamino, hydroxyethylamino, mercaptoethylamnio, anilino, $\alpha$-naphthylamino, $\beta$-naphthylamino, 4-hydroxyphenylamino, p-toluidino, 3-methyl-4-piperidino, ketopieridino, triacetoneamino, 4,6 - dichloro-3,5-di-tert.-butyl - 4 - hydroxyphenylamino, pyrrolidino, ppieridino, ketopyperidino, triacetoneamino, 4,6-dichloro-1,3,5-triazin-2-ylamino, 4,6-bis-(4-hydroxy-3,5 - di - tert.-butylphenoxy)-1,3,5-triazin-2-ylamino, 4-chloro-6 - octylthio-1,3,5-triazin-2-ylamino, 4-chloro-6-(4-hydroxy-3,5-di-tert.-butylphenylthio)-1,3,5-triazin-2-ylamino dimethylhydrazino, diethylaminomethylamino, diethylaminoethylamino, diethylaminopropylamino.

3. A polyurethane elastomeric composition according to claim 1 wherein said substantially linear polymer terminal hydroxy groups and a molecular weight of 600 to 5000 is selected from the group consisting of poly-ε-caprolactone glycol, polybutylene adipate, glycol poly-δ-valerolactone glycol, polybutylene succinate glycol, polypropylene adipate glycol, polypropylene succinate glycol, polyethylene ether glycol, polypropylene ether glycol, polyethylene sebacate glycol and polytetramethylene ether glycol.

4. A polyurethane elastomeric composition according to claim 1, wherein said bifunctional chain extender is selected from the group consisting of hydrazine, ethylenediamine, propylenediamine, tetramethylenediamine, and ethylene glycol.

5. A polyurethane elastomeric composition according to claim 1 wherein said organic diisocyanate is selected from the group consisting of 4,4'-diphenylmethane diisocyanate, 4,4'-isopropylidenediphenyl diisocyanate, 2,4-tolylene diisocyanate, 2,6-tolylene diisocyanate and phenylene diisocyanate.

6. In the method of providing an improved elastomeric composition based upon a polyurethane elastomer obtained by reacting a substantially linear polymer having terminal hydroxy groups and a molecular weight of 600 to 5000, a bifunctional chain extender having active hydrogen atoms and an organic diisocyanate, the improvement which comprises the incorporation of from 0.1–20% of said vinyl copolymer of claim 1 based upon the weight of said polyurethane elastomer, whereby resultant composition possesses an enhanced whiteness.

References Cited

UNITED STATES PATENTS

| | | | |
|---|---|---|---|
| 3,290,208 | 12/1966 | Lewis | 161—190 |
| 3,309,261 | 3/1967 | Schiller | 161—190 |
| 3,391,054 | 7/1968 | Lewis | 260—835 |
| 3,214,392 | 10/1965 | Worsley | 260—835 |
| 3,428,708 | 2/1969 | Kuryla | 260—830 P |

OTHER REFERENCES

Chemical Abstracts, vol. 74, 1970, 4741X, K. Matsubayashi et al.

PAUL LIEBERMAN, Primary Examiner

U.S. Cl. X.R.

260—45.8 N, 45.95, 830 P, 836